(12) United States Patent
Viswanathan

(10) Patent No.: US 12,154,156 B2
(45) Date of Patent: Nov. 26, 2024

(54) SYSTEM AND METHOD FOR GENERATING AND PRESENTING ON-DEMAND DETAILING CONTENT WITH COMMUNICATION INTERFACE ABOUT A PRODUCT OR SERVICE

(71) Applicants: RxPrism Health Systems Private Limited, Bangalore (IN); Maruthi Viswanathan, Bangalore (IN)

(72) Inventor: Maruthi Viswanathan, Bangalore (IN)

(*) Notice: Subject to any disclaimer, the term of this patent is extended or adjusted under 35 U.S.C. 154(b) by 193 days.

(21) Appl. No.: 17/866,516

(22) Filed: Jul. 17, 2022

(65) Prior Publication Data

US 2022/0351267 A1 Nov. 3, 2022

Related U.S. Application Data

(63) Continuation of application No. 16/056,229, filed on Aug. 6, 2018, now Pat. No. 11,657,440.

(30) Foreign Application Priority Data

Apr. 22, 2018 (IN) .............................. 201841015211

(51) Int. Cl.
  *G06Q 30/0601* (2023.01)
  *G06K 7/14* (2006.01)
  *G06Q 30/02* (2023.01)

(52) U.S. Cl.
  CPC ....... *G06Q 30/0627* (2013.01); *G06K 7/1417* (2013.01); *G06Q 30/0281* (2013.01)

(58) Field of Classification Search
  CPC . G06Q 30/0627; G06Q 30/028; G06K 7/1417
  See application file for complete search history.

(56) References Cited

U.S. PATENT DOCUMENTS

| | | | |
|---|---|---|---|
| 9,100,394 B2* | 8/2015 | Grochowicz | H04L 67/141 |
| 2015/0237207 A1* | 8/2015 | Ordille | H04L 63/08 |
| | | | 379/211.02 |
| 2016/0246781 A1* | 8/2016 | Cabot | G16H 40/67 |

OTHER PUBLICATIONS

J. Rouillard, "Contextual QR Codes," 2008 The Third International Multi-Conference on Computing in the Global Information Technology (iccgi 2008), Athens, Greece, 2008, pp. 50-55, doi: 10.1109/ICCGI.2008.25. (Year: 2008).*

* cited by examiner

*Primary Examiner* — Michelle T Kringen
(74) *Attorney, Agent, or Firm* — Gregson IP Law LLC

(57) ABSTRACT

The present invention relates to a computer implemented method (1000) for generating and presenting on-demand detailing content (120) with communication interface (128) about a product or service (102). The invention facilitates a plurality of first set of users (106) to scan a product or service recognition code (140) and to obtain on-demand detailing content (120) about particular product or service (102) created by second set of users (110) using authoring module (112) and configured the communication user interface (122) to facilitate real-time communication between first set of users (106) and plurality of third set of users (132) over a live video and/or audio call or text. Further, the invention enables the plurality of second set of users (110) to edit or modify or update the on-demand detailing content (120) about the product or service (120) time to time without a need of changing product or service recognition code (140) and map or link the updated or modified or edited on-demand detailing content about the product or service with an information module (116) as network based resource.

13 Claims, 8 Drawing Sheets

SYSTEM AND METHOD FOR GENERATING AND PRESENTING ON-DEMAND DETAILING CONTENT WITH COMMUNICATION INTERFACE ABOUT A PRODUCT OR SERVICE

FIELD OF THE INVENTION

Embodiments of the present invention relate generally to multimedia and interactive technologies and more particularly to a system and a method for generating and presenting on-demand detailing content about a product or service with communication interface.

BACKGROUND OF THE INVENTION

In our day-to-day life, we all visit places, such as retail stores, commercial showrooms, pharmacy retails, online e-commerce retails, online pharmacy retails, and hospitals for various reasons. We would interact with the people who manage or consult at these places to learn or buy products or services. However, in all these places, the quality of interaction with the appropriate person, timely assistance, and the quality of information being shared have never been adequate and consistent. This leads us to compromise various aspects and results in complete dissatisfaction.

A customer or consumer visits retail stores or commercial showrooms to see a product, understand how a product works, or learn the technical details of a product from qualified personnel and decide to buy it. However, most of the time, the consumer does not find instant assistance due to limited sales executives or a sudden inflow of customers. At other times, the sales staff detailing a product/service may not have adequate knowledge about the product/service. To address these problems, retail stores and commercial showroom managers often spend lots of money, time, and effort on hiring and training good sales personnel. Despite the efforts, constant attrition, cost of human resources, and inadequate training leads to customer dissatisfaction. In addition, the increase in cost of retail and commercial spaces adds to the cost of the product or service being offered, which in turn leads to higher price tags over online e-commerce options. This is the key reason why many customers visit retail showrooms to see the product and do their purchases online. Retail and commercial showrooms therefore fail to convert walk-in customers to active buyers and thereby underperform.

When a consumer purchases or plans to purchase any product, he/she never gets an opportunity to understand all aspects of the product in detail from the manufacture in a non-promotional manner. Oftentimes, manufacturers opt for marketers to do the communication of their products with consumers. Customer support team or product expert team only comes after the sale of the product. Consumers instead rely on various websites and publically available sources to gather information on a product, which may actually be completely unreliable. Product specifications are usually printed on the package and installation guides are often found within the package. Before the purchase of the product, the consumer has zero access to these materials! Even after completing the purchase, many consumers do not find time or patience to read the instructions or user manual and instead look for video-based assistance or tutorials online, again ending up with unauthorized info. If consumer tries to reach the call center, he/she has to go through complex interactive voice response systems, call waiting, etc., Even if they reach the customer support finally, they will receive oral instructions only, which may not always be consumer friendly. Besides, such support system adds an additional cost to the manufacturer by way of telephone charges and cost for call center infrastructure and human resources.

When a consumer visits a pharmacy to pick up an over-the-counter (OTC) medicine for a trivial problem, he/she picks it up as per his/her understanding of the product or the advertisement that he/she has seen on the television or Internet. Not all consumers are equally knowledgeable to read and understand the indications, side effects, drug interactions, or details on the duration of use before picking up their choice from the numerous options that they see on the counter. This may lead to selecting incorrect or inappropriate medication or may result in self-medication or medication abuse. Pharmacies hire and deploy qualified pharmacists for disbursing prescription medications, but the support for OTC medications is negligible. In addition, it would cost a lot for pharmacy retails to deploy as many pharmacists to attend and support all consumers visiting their OTC medicine sections. This eventually leads to a gap in the service of pharmacy retails in attending, communicating, and educating about OTC medications to consumers before they make informed choices. However, in recent days, the role of pharmacists is changing in that he/she is expected to play a significant part in self-care and self-medication to reduce OTC medication abuse.

Pharmacy retails disperse prescription medicines through their pharmacists as prescribed by physicians. During the interaction between pharmacists and patients, pharmacists are expected to educate patients appropriately and provide adequate information on the drug. However, most times, the information provided are not being grabbed or understood properly by the patients as some of them may require reiteration of information. If patients fail to pick up the information properly, they are again left with the Internet to search and find the required details. This may eventually lead to poor medication compliance or non-adherence with poor healthcare outcome. Besides, many e-commerce online retails refill or deliver medicines at doorsteps based on the prescription shared with them on the Internet. In such a scenario, the pharmacist meeting the patient and providing specific information about the medicines is compromised. Many a times, such instructions are given on a piece of paper as text content, which the patient fails or hesitates to read and understand. This also could lead to drug abuse or poor medication compliance.

When a patient visits a doctor or a hospital for consultation or treatment, healthcare professionals (HCPs) spend significant amount of time explaining the necessary information to the patient during discharge or consultation. Nevertheless, some patients find it hard to understand the info and require slow and repeated explanations in simple language. However, due to their busy schedules, some of the HCPs typically do not repeat the instructions and turn to attend waiting patients. The patients also hesitate to clarify their doubts with the HCPs. When a caregiver or family member back at home asks the patient about the treatment, they are unable to recollect some or most of the info. Finally, they also depend on the Internet for the necessary info. This could again lead to drug abuse or poor medication compliance.

How about visitors at all the aforementioned places receiving instant and up-to-date info in their preferred language through an interactive media-based format? Yes, such a solution would allow consumers to understand the subject on-demand adequately and in a shorter time.

A number of such solutions claiming to help consumers, patients, visitors, or customers receive instant information have been doing its rounds in the market for some time now. Few of them are discussed herein below:

WO2017166944A1 discloses a method for providing service access wherein a user provides a service description by using an interface engine. The interface engine analyzes a service demand of the user from the service description of the user and generates at least one service flow for access on the basis of the service demand.

EP1625487A1 describes a self-service terminal. The terminal has a user interface comprising a synthetic character. The terminal is coupled to a database that includes information about users of the terminal. The terminal is operable to present an adapted character to a user, where one or more aspects of the character have been adapted to reflect changes in the user.

WO2002057896A3 talks about a method of providing an interactive virtual assistant (IVA). An animated virtual character is generated in response to a user input to perform a task. The task ranges from a virtual receptionist to a museum guide. Possible tasks include alerting a third party to the presence of a visitor; guiding a user around an exhibition; or arranging meetings and conferences via IVAs belonging to third parties.

U.S. Pat. No. 6,349,290B1 discloses an automated system and method for presenting both interactive and proactive customized and personalized advice for a customer by a financial institution is based on a sophisticated customer profile generated by the system according to an analysis of the customer from a totality of the customer's interaction with the system. The system includes an advice engine, which is primarily software, that considers numerous sets of system logic, such as legal constraints and statistical facts that affect the customer and generates the advice. The system does include a presentation engine which varies the presentation, depending in part on the mode by which the customer accesses the system, but regardless of the mode, presents the advice to the customer in an individualized manner.

Though the aforesaid documents and other existing methods/systems strive to provide solutions to the problem discussed above. However, most or all of them come with a number of limitations or shortcomings, such as inaccurate or outdated information, high cost of content generation, inefficient method of content creation and management, lack of live interaction to answer user queries instantly, and so on. There is not one single effective system or method for both the managers of such places and the consumers visiting such locations.

The expectations of retail store managers and hospitals are to find cost-effective ways to create content through their existing employees in an automated way and not through expensive agencies or professional video shoots, editing, and post-production options. In brief, they expect to manage the content easily, set-up communication and interactive options on-demand, allow the content and interactive communication accessible to customers instantly without difficulties, utilize their existing human resources effectively, reduce cost by automating certain tasks, allow their employees to design the content, deliver at the lowest system cost, and develop institutional capabilities to do it repeatedly.

The expectations of the consumers, patients, and visitors are to receive instant on-demand latest information about a product or service of their interest in multiple languages without much technology requirements, such as installing an app. If need be, connect instantly with the support team for further clarification through free video calls, all these and more without any increase in price for the service or product.

Therefore, there remains a need in the art for a system and a method for providing on-demand detailing content about a product or service with communication interface.

Any discussion of the background art throughout the specification should in no way be considered as an admission that such background art is prior art nor that such background art is widely known or forms part of the common general knowledge in the field worldwide.

OBJECT OF THE INVENTION

An object of the present invention is to provide a system for generating and presenting on-demand detailing content about a product or service with communication interface.

Another object of the present invention is to provide a method for generating and presenting on-demand detailing content about a product or service with communication interface.

SUMMARY OF THE INVENTION

Embodiments of the present invention aim to provide a system and a method for generating and presenting on-demand product or service detailing content with communication interface. The invention enables customers to receive required information in real-time about a product or service on their personal portable devices and eliminate or reduce any need of interaction with sales representatives for getting basic information about the product or service. Further, the invention enables the stakeholders such as sales representative or business owner or customer service personnel or retail managers or service provider or merchandiser or pharmacist or healthcare professionals or trainer or educator or administrators of retails and showrooms or commercial establishment or pharmacy or hospitals or non-commercial establishment or institutional establishment or product manufacturer and marketers to instantly create interactive multimedia content about a product or service and store in the network so that the customers can view them on-demand. Also, the invention provides communication interface to the customers enabling them to get the information from a BOT, sales representative present at the store, customer care executive or subject matter expert present at a remote location.

In accordance with an embodiment of the present invention, a system for generating and presenting on-demand product or service detailing content with communication interface is provided. The system comprising a plurality of first computing devices operated by a plurality of first set of users, a plurality of second computing devices operated by a plurality of second set of users, an authoring module, a product or service recognition module, an information module and a communication network. The plurality of first computing devices scans and identify a product or service recognition code and reach the product or service recognition module through the communication network which is configured to redirect the plurality of first computing devices to connect with the information module through the communication network. Further, the information module is configured to deliver relevant streaming on-demand product or service detailing content in multiple languages as per geo location or customer choice to the plurality of first computing devices. The information module is further configured to connect the plurality of first computing devices to a plurality of communication user interfaces to deliver on-demand real-time information about the product or service in multiple languages. The authoring module is configured to create the on-demand product or service detailing content based on inputs received through the communication network from the plurality of second computing devices operated by the plurality of second set of users and store the on-demand product or service detailing content on the information module as network-based resource. The communication network is configured to establish communication and data transfer between the plurality of first computing devices, the plurality of second computing devices, the information module, the authoring module and the product or service recognition module.

The plurality of first computing devices is, but not limited to, personal portable handheld device of the plurality of first set of users having, but not limited to, a display, a graphical user interface and a product or service recognition code scanner.

The plurality of first set of users is, but not limited to, an individual, buyer or customer or visitor or guest or observer or consumer or patients or recipient or audience looking to buy a product or avail a service or learn about a product or artifacts or a subject.

The plurality of second computing devices is, but not limited to, portable handheld device, laptop, desktop, tablet.

The plurality of second set of users is, but not limited to, a sales representative or business owner or customer service personnel or retail managers or service provider or merchandiser or pharmacist or healthcare professionals or trainer or educator or administrators of retails and showrooms or commercial establishment or pharmacy or hospitals or non-commercial establishment or institutional establishment or product manufacturer and marketers.

In accordance with an embodiment of the present invention, the authoring module enables the plurality of second set of users to provide inputs, by using the plurality of second computing devices, to create the on-demand product or service detailing content, in multiple languages, by using digital assets or live video along with audio recording or live audio recording, along with detailing multimedia presentation slide content being navigated or changes or marked or highlighted certain information in the slide as per video/audio narration or description being spoken and get synchronized.

The digital assets are, but not limited to, a group of existing videos with audio, existing audio, presentation slide content, images, photos of product, photographs of pills or medicines, interactivity, polls, audio, graphics, video, animation, URLs, embedded media players to render media content and combination thereof.

In accordance with an embodiment of the present invention, the authoring module enables the plurality of second set of users to provide inputs, by using the plurality of second computing devices, to create the on-demand product or service detailing content, in multiple languages, by using Artificial Intelligence based BOT Avatar, Machine voice and dynamic content curation from third party repository and create dynamic content automatically or semi-automatically along with detailing multimedia presentation slide content being navigated or changes or marked or highlighted certain information in the slide as per BOT avatar video/audio/machine voice narration or description and get synchronized.

In accordance with an embodiment of the present invention, the authoring module is configured to record, synthesize and store the on-demand product or service detailing content, in multiple languages, on the information module as network-based resource.

In accordance with an embodiment of the present invention, wherein the product or service recognition module further comprises of a product registry module, which enables the plurality of second set of users to provide inputs, by using the plurality of second computing devices, to register a product registry information about their respective product or service on the product or service recognition module and receive the product or service recognition code for their respective product or service.

In accordance with an embodiment of the present invention, the product or service recognition code is a two-dimensional/three-dimensional barcode or multi-dimensional code or quick recognition code or typographical symbol or image in an electronic or physical form.

In accordance with an embodiment of the present invention, the product or service recognition code comprising the product registry information about the product or service such as technical specification and instructions, Unique ID, Unique network URL of product or service registry module.

In accordance with an embodiment of the present invention, the product or service recognition code is provided physically near or attached to the product in a printed form.

In accordance with an embodiment of the present invention, the product or service recognition code is provided in a RFID tag, NFC tag, beacon attached to the product or kept near to the product.

In accordance with an embodiment of the present invention, the product registry module enables the plurality of second set of users to provide inputs, by using the plurality of second computing devices, to update the product registry information about their respective product or service and link related on-demand product or service detailing content and communication interfaces on the information module.

In accordance with an embodiment of the present invention, the plurality of communication user interfaces configured to provide on-demand real-time information about the product or service to the plurality of first computing devices via dynamic graphical user interface, stored network-based resources, remote text chat or voice & video call from a plurality of third computing devices operated by a plurality of third set of users.

In accordance with an embodiment of the present invention, the plurality of third computing devices is portable handheld device, laptop, desktop, tablet.

In accordance with an embodiment of the present invention, the plurality of third set of users are remote or local customer support team or subject matter experts who interact live with the plurality of first set of users through the plurality of communication user interfaces.

In accordance with an embodiment of the present invention, the information module further comprises of a pre-booking module which enables the plurality of first set of users to pre-book a particular product or service by providing pre-booking inputs after scanning product or service recognition code, by using the plurality of first computing devices.

In accordance with an embodiment of the present invention, the information module further comprises of a stock availability module which enables the plurality of first set of users to request stock availability details after scanning the product or service recognition code, by using the plurality of first computing devices, to receive on-demand real-time information about the stock availability of particular product or service.

In accordance with an embodiment of the present invention, the communication network is a wired or wireless network for data communication.

In accordance with an embodiment of the present invention, the plurality of communication user interfaces configured to enable first set of users to interact via plurality of first computing devices with artificial intelligence enabled BOTs through text chat, voice conversation interaction to receive on-demand real-time information about the product or service.

In accordance with an embodiment of the present invention, the plurality of communication user interfaces enable the plurality of first set of users to request via plurality of first computing devices for on-spot assistance from the plurality of second set of users.

In accordance with an embodiment of the present invention, a method for generating and presenting on-demand product or service detailing content with communication interface is provided. The method comprising the steps of scanning & identifying a product or service recognition code by a plurality of first computing devices operated by a plurality of first set of users, reaching a product or service recognition module through a communication network, redirecting the plurality of first computing devices by the product or service recognition module, connecting the plurality of first computing devices with an information module and delivering streaming on-demand product or service detailing content, in multiple languages, along with a plurality of communication user interfaces to the plurality of first computing devices through the communication network.

In accordance with an embodiment of the present invention, the plurality of first computing devices is personal portable handheld device of the plurality of first set of users having a display, a graphical user interface and a product or service recognition code scanner.

In accordance with an embodiment of the present invention, the plurality of first set of users is an individual, buyer or customer or visitor or guest or observer or consumer or patients or recipient or audience looking to buy a product or avail a service or learn about a product or artifacts or a subject.

In accordance with an embodiment of the present invention, the method further comprising the steps of creating the on-demand product or service detailing content in multiple languages by an authoring module based on inputs received from the plurality of second set of users using plurality of second computing devices through communication network and storing the on-demand product or service detailing content on the information module as network-based resource.

In accordance with an embodiment of the present invention, the plurality of second computing devices is portable handheld device, laptop, desktop, tablet.

In accordance with an embodiment of the present invention, the plurality of second set of users is a sales representative or business owner or customer service personnel or retail managers or service provider or merchandiser or pharmacist or Healthcare professionals or trainer or educator or administrators of retails and showrooms or commercial establishment or Pharmacy or hospital or non-commercial establishment or institutional establishment or product manufacturer and marketers.

In accordance with an embodiment of the present invention, the step of creating further comprising a step of authoring the on-demand product or service detailing content, in multiple languages, by using digital assets or live video along with audio recording or live audio recording, along with detailing multimedia presentation slide content being navigated or changes or marked or highlighted certain information in the slide as per video/audio narration or description being spoken and get synchronized.

In accordance with an embodiment of the present invention, the digital assets is a group of existing video with audio, existing audio, presentation slide content, images, photos of product, photographs of pills or medicines, interactivity, polls, audio, graphics, video, animation, URLs, embedded media players to render media content and combination thereof.

In accordance with an embodiment of the present invention, the step of creating further comprising a step of authoring by using Artificial Intelligence based BOT, BOT Avatar, Machine voice and dynamic content curation from third party repository and create dynamic content automatically or semi-automatically along with detailing multimedia presentation slide content being navigated or changes or marked or highlighted certain information in the slide as per BOT avatar video/audio/machine voice narration or description and get synchronized.

In accordance with an embodiment of the present invention, the step of creating further comprising the steps of authoring, recording and synthesizing the on-demand product or service detailing content in multiple languages.

In accordance with an embodiment of the present invention, the step of delivering further comprising a step of connecting the plurality of first computing devices with a plurality of communication user interfaces to deliver on-demand real-time information about the product or service.

In accordance with an embodiment of the present invention, the step of connecting comprising a step of providing on-demand real-time information about the product or service to the plurality of first computing devices via dynamic graphical user interface, stored network-based resources, remote text chat or voice & video call from a plurality of third computing devices operated by a plurality of third set of users.

In accordance with an embodiment of the present invention, the plurality of third computing devices is portable handheld device, laptop, desktop, tablet.

In accordance with an embodiment of the present invention, the plurality of third set of users are remote or local customer support team or subject matter experts who interact live with the plurality of first set of users through the plurality of communication user interfaces.

In accordance with an embodiment of the present invention, the method further comprising the steps of providing a product or service related information on a product registry module by the plurality of second set of users using the plurality of second computing devices through the communication network, registering product or service related information on a product registry module and linking relevant on-demand product or service detailing content along with the communication user interface and receiving the product or service recognition code for their respective product or service.

In accordance with an embodiment of the present invention, the product or service recognition code is a two-dimensional/three-dimensional barcode or multi-dimensional code or quick recognition code or typographical symbol or image in an electronic or physical form.

In accordance with an embodiment of the present invention, the product or service recognition code comprising the product registry information about the product or service such as technical specification and instructions, Unique ID, Unique network URL of product or service registry module.

In accordance with an embodiment of the present invention, the product or service recognition code is provided physically near or attached to the product in a printed form.

In accordance with an embodiment of the present invention, the product or service recognition code is provided in a RFID tag, NFC tag, beacon attached to the product.

In accordance with an embodiment of the present invention, the method further comprising the steps of updating the product registry information about their respective product or service by the plurality of second set of users by using the plurality of second computing devices and linking related on-demand product or service detailing content and communication user interfaces on the information module.

In accordance with an embodiment of the present invention, the method further comprising the steps of scanning & identifying a product or service recognition code by a plurality of second computing devices operated by a plurality of second set of users, reaching and connecting to product or service recognition module through a communication network, updating the pertaining product registry information and linking different on-demand product or service detailing content from the information module.

In accordance with an embodiment of the present invention, the method further comprising the steps of scanning & identifying a product or service recognition code by a plurality of second computing devices operated by a plurality of second set of users, reaching and connecting to product or service recognition module through a communication network, creating the on-demand product or service detailing content by an authoring module based on inputs received from the plurality of second set of users using plurality of second computing devices through communication network, storing the on-demand product or service detailing content on the information module as network-based resource and linking the stored on-demand product or service detailing content from the information module with particular product registry information of scanned product or service recognition code.

In accordance with an embodiment of the present invention, the method further comprising a step of pre-booking particular product or service to the plurality of first set of users.

In accordance with an embodiment of the present invention, the plurality of communication user interfaces configured to enable first set of users to interact via plurality of first computing devices with artificial intelligence enabled BOTs through text chat, voice conversation interaction to receive on-demand real-time information about the product or service.

In accordance with an embodiment of the present invention, the plurality of communication user interfaces enables the plurality of first set of users to request via plurality of first computing devices for on-spot assistance from the plurality of second set of users.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1:
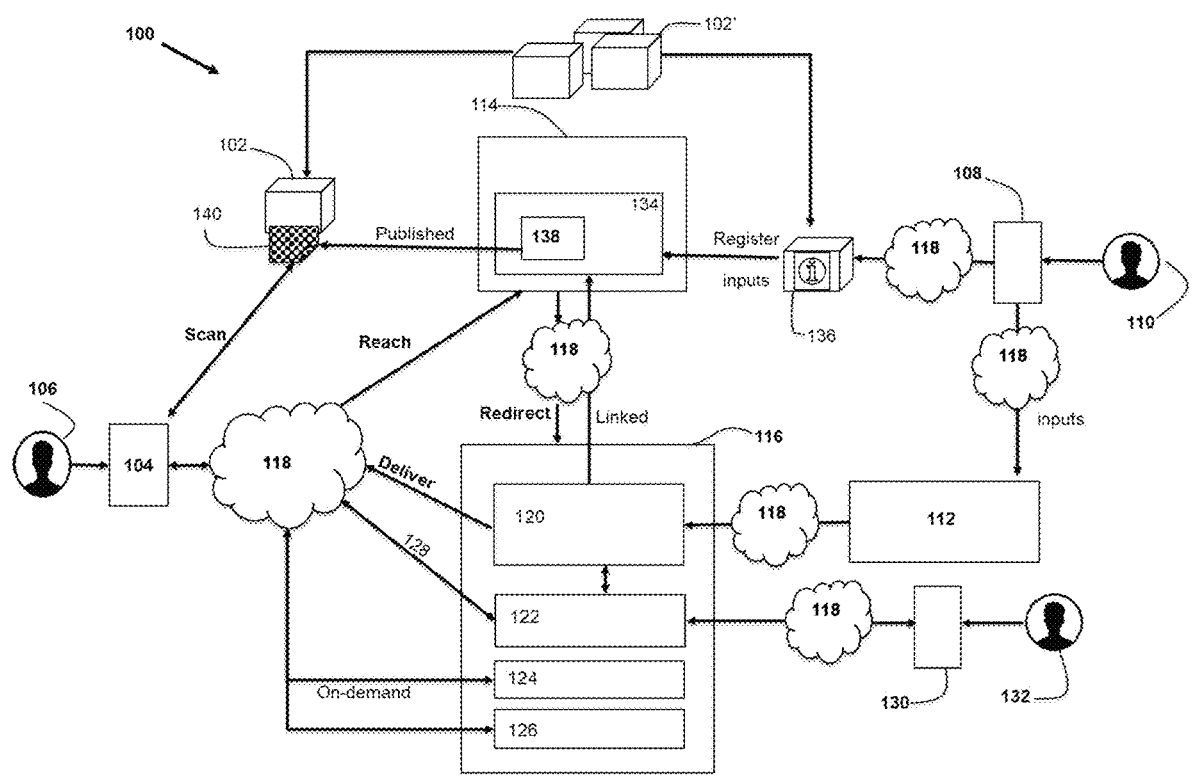
FIG. 1 illustrates a system for generating and presenting on-demand product or service detailing content with communication interface, in accordance with an embodiment of the present invention.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Further, the various embodiments described herein below include specific method steps in an exemplary order but a wide variety of other such method steps could be implemented within the scope of the invention, including additional steps, omission of some steps, or performing the method in a different order.

The present invention aims to overcomes the drawbacks of the prior art by enabling the retail store managers, pharmacy retails, online pharmacy, product manufacturers, lifescience companies and hospitals are to create on-demand detailing content of their product/service in cost-effective ways through their existing employees/product experts/advisors/Healthcare professionals in an automated way. They manage the content easily, set-up communication and interactive options on-demand, allow the content and interactive communication accessible to customers instantly in multiple languages without difficulties through product or service recognition codes, utilize their existing human resources effectively, reduce cost by automating certain tasks, allow their employees to design the content, deliver at the lowest system cost, and develop institutional capabilities to do it repeatedly.

The consumers, patients, and customers are to receive instant on-demand latest information about a product or service of their interest in multiple languages by just scanning the product or service recognition code on their any portable hand-held devices without much technology requirements, such as installing an app etc. No need to wait for any sales personnel/pharmacist/product expert support to explain about the product or services on which they are interested. If need be, connect instantly with the support team for further clarification through free video calls. Request for additional information about a particular product or service. Request for on-spot assistance from their portable hand-held device.

So that the consumer can make better purchase decisions of a product or service after understanding about the product and service better, without need of meeting any human based assistance. Retails can go for human-less or less-human stores—almost automated system, reduce the cost, enable the customers to look for a product or service what they are interested, scan the code and get more information learn about them, need be connect with remote team to get assistance, then make purchase decisions, pick-up the product and walk away after making payment at the bill counter. Online retails, lifescience companies and pharmacies can provide advises on patients' medication while refilling medicines as per received prescription through internet without meeting the patient.

However, a person skilled in the art would appreciate that the invention is not limited to the exemplary environment discussed below alone and can be implemented in various other physical environments, without departing from the scope of the invention.

Referring to the drawings, the invention will now be described in more detail. FIG. 1 illustrates a system (100) for generating and presenting on-demand product or service detailing content (120) with communication interface (128). The system (100) comprises of a plurality of first computing devices (104) operated by a plurality of first set of users (106), a plurality of second computing devices (108) operated by a plurality of second set of users (110), an authoring module (112), a product or service recognition module (114), an information module (116) and a communication network (118).

The on-demand product or service detailing content (120) provides information about a product or service (102). The product or service (102) is, but not limited to, consumer products, electronics, over-the-counter medicines, prescription medicines, Artifacts, consultation service, medical advices, prescriptions etc.

The plurality of first computing devices (104) is, but not limited to, personal portable handheld device of the plurality of first set of users (106) having a display, a graphical user interface and a product or service recognition code scanner. The plurality of first computing devices (104) may be selected from a group comprising mobile handheld devices (such as mobile phones, PDA and tablet PCs etc.) and notebooks etc. The plurality of first computing devices (104) is envisaged to be connected with one or more input devices (such as a keyboard, a camera, microphone etc.) (not shown) and one or more output devices (such as a display screen, speaker etc.) (not shown). In case of mobile handheld devices such as a smartphone, the one or more input devices and the one or more output devices may be integrally provided. For example, in touch-input based camera-enabled smartphone no external devices need to be connected. Further, the product or service recognition code scanner is capable of recognise two-dimensional/three-dimensional barcode or multi-dimensional code or quick recognition code or typographical symbol or image in an electronic or physical form or near field communication or RFID tags or radio communication beacons. Also, the graphical user interface may be any type of user interface, customizable or standard, which allows the plurality of first set of users (106) to interact with electronic devices through graphical icons and visual indicators.

The plurality of first computing devices (104) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the plurality of first computing devices (104) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The plurality of first set of users (106) is, but not limited to, an individual, buyer or customer or visitor or guest or observer or consumer or patients or recipient or audience looking to buy a product or avail a service or learn about a product or artifacts or a subject.

The plurality of second computing devices (108) is, but not limited to, portable handheld device, laptop, desktop, tablet. The plurality of second computing devices (108) may be selected from a group comprising mobile handheld devices (such as mobile phones, PDA and tablet PCs etc.), Desktop PCs and notebooks etc. The plurality of second computing devices (108) is envisaged to be connected with one or more input devices (such as a keyboard, a camera, microphone etc.) (not shown) and one or more output devices (such as a display screen, speaker etc.) (not shown). In case of mobile handheld devices such as a smartphone, the one or more input devices and the one or more output devices may be integrally provided. For example, in touch-input based camera-enabled smartphone no external devices need to be connected.

The plurality of second computing devices (108) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the plurality of second computing devices (108) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The plurality of second set of users (110) is, but not limited to, a sales representative or business owner or customer service personnel or retail managers or service provider or merchandiser or pharmacist or healthcare professionals or trainer or educator or administrators of retails and showrooms or commercial establishment or pharmacy or hospitals or non-commercial establishment or institutional establishment or lifescience companies or product manufacturer and marketers.

The authoring module (112) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the authoring module (112) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The authoring module (112) enables the plurality of second set of users (110) to provide inputs, by using the plurality of second computing devices (108), to create the on-demand product or service detailing content (120), in multiple languages, by using digital assets or live video along with audio recording or live audio recording, along with detailing multimedia presentation slide content being navigated or changes or marked or highlighted certain information in the slide as per video/audio narration or description being spoken and get synchronized. Preferably, the multiple languages may be selected from English, Hindi, Spanish, Arabic, any international and regional languages. Also, the digital assets is a group of existing videos with audio, existing audio, presentation slide content, images, photos of product, photographs of pills or medicines, interactivity, polls, audio, graphics, video, animation, URLs, embedded media players to render media content and combination thereof.

The authoring module (112) further enables the plurality of second set of users (110) to provide inputs, by using the plurality of second computing devices (108), to create the on-demand product or service detailing content (120), in multiple languages, by using Artificial Intelligence based BOT Avatar, Machine voice and dynamic content curation from third party repository and create dynamic content automatically or semi-automatically along with detailing multimedia presentation slide content being navigated or changes or marked or highlighted certain information in the slide as per BOT avatar video/audio/machine voice narration or description and get synchronized. Preferably, the multiple languages may be selected from English, Hindi, Spanish, Arabic, any international and regional languages.

The authoring module (112) is further configured to record, synthesize and store the on-demand product or service detailing content (120), in multiple languages, on the information module (116) as network-based resource.

The product or service recognition module (114) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the product or service recognition module (114) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The product or service recognition module (114) further comprises of a product registry module (134), which enables the plurality of second set of users (110) to provide inputs, by using the plurality of second computing devices (108), to register a product registry information about their respective product or service (102, 102') on the product or service recognition module (114) and receive the product or service recognition code (138) for their respective product or service.

The product or service recognition code (138) is a two-dimensional/three-dimensional barcode or multi-dimensional code or quick recognition code or typographical symbol or image in an electronic or physical form (140).

Further, for sake clarity product or service recognition code (138) refers to the electronic form of the code and product or service recognition code (140) refers to the physical form of the code.

Further, the product or service recognition code (138) comprising the product registry information about the product or service (102) such as technical specification and instructions, Unique ID, Unique network URL of product or service registry module (134). Preferably, the product or service recognition code (138) is provided physically near or attached to the product (102) in a printed form (140). Also, the product or service recognition code (138) is provided in a RFID tag, NFC tag, beacon attached to the product (102).

The product registry module (134) enables the plurality of second set of users (110) to provide inputs, by using the plurality of second computing devices (108), to update the product registry information about their respective product or service (102) and link related on-demand product or service detailing content (120) and the plurality of communication user interfaces (122) on the information module (116).

The information module (116) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the information module (116) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The information module (116) stores on-demand product or service detailing content (120). Further, the information module (116) comprises of the plurality of communication user interfaces (122), a pre-booking module (124) and a stock availability module (126).

The plurality of communication user interfaces (122) configured to provide on-demand real-time information about the product or service (102) to the plurality of first computing devices (104) via dynamic graphical user interface, stored network-based resources, remote text chat or voice & video call from a plurality of third computing devices (130) operated by a plurality of third set of users (132).

The plurality of third computing devices (130) is, but not limited to, portable handheld device, laptop, desktop, tablet. The plurality of third computing devices (130) may be selected from a group comprising mobile handheld devices (such as mobile phones, PDA and tablet PCs etc.), Desktop PCs and notebooks etc. The plurality of second computing devices (108) is envisaged to be connected with one or more input devices (such as a keyboard, a camera, microphone etc.) (not shown) and one or more output devices (such as a display screen, speaker etc.) (not shown). In case of mobile handheld devices such as a smartphone, the one or more input devices and the one or more output devices may be integrally provided. For example, in touch-input based camera-enabled smartphone no external devices need to be connected.

The plurality of third computing devices (130) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the plurality of third computing devices (130) includes a processor or plurality of high speed computing processors with multiple cores (not shown) operably connected with the memory unit. In various embodiments, the processor is one of, but not limited to, a general-purpose processor, an application specific integrated circuit (ASIC) and a field-programmable gate array (FPGA).

The plurality of third set of users (132) are, but not limited to, remote or local customer support team or healthcare professionals or subject matter experts who interact live with the plurality of first set of users (106) through the plurality of communication user interfaces (122).

The plurality of communication user interfaces (122) configured to enable first set of users (106) to interact via plurality of first computing devices (104) with artificial intelligence enabled BOTs through text chat, voice conversation interaction to receive on-demand real-time information about the product or service (102).

Further, the plurality of communication user interfaces (122) enable the plurality of first set of users (106) to request via plurality of first computing devices (104) for on-spot assistance from the plurality of second set of users (110).

The pre-booking module (124) which enables the plurality of first set of users (106) to pre-book a particular product or service by providing pre-booking inputs after scanning product or service recognition code (140), by using the plurality of first computing devices (104).

The pre-booking module (124) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the pre-booking module (124) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The stock availability module (126) enables the plurality of first set of users (106) to request stock availability details after scanning the product or service recognition code (140), by using the plurality of first computing devices (104), to receive on-demand real-time information about the stock availability of particular product or service (102).

The stock availability module (126) is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the stock availability module (126) includes a processor or plurality of high speed computing processors with multiple cores (not shown) operably connected with the memory unit. In various embodiments, the processor is one of, but not limited to, a general purpose processor, an application specific integrated circuit (ASIC) and a field-programmable gate array (FPGA).

The communication network (118) may be one of, but not limited to, wired network or wireless network or a Local Area Network (LAN) or a Wide Area Network (WAN). The communication network (118) may be implemented using a number of protocols, such as but not limited to, TCP/IP, 3GPP, 3GPP2, LTE, IEEE 802.x, HTTP, HTTPS, UDP, RTMP etc. The communication network (118) is configured to establish communication and data transfer between the plurality of first computing devices (104), the plurality of second computing devices (108), the plurality of third computing devices (130), the information module (116), the authoring module (112) and the product or service recognition module (114).

As shown in FIG. 1, the plurality of first computing devices (104) scan and identify a product or service recognition code (140) and reach the product or service recognition module (114) through the communication network (118) which is configured to redirect the plurality of first computing devices (104) to connect with the information module (116) through the communication network (118). Further, the information module (116) is configured to deliver relevant streaming on-demand product or service detailing content (120) in multiple languages to the plurality of first computing devices (104). The information module (116) is further configured to connect the plurality of first computing devices (104) to the plurality of communication user interfaces (122) to deliver on-demand real-time information about the product or service (102) in multiple languages. The authoring module (112) is configured to create the on-demand product or service detailing content (120) based on inputs received through the communication network (118) from the plurality of second computing devices (108) operated by the plurality of second set of users (110) and store the on-demand product or service detailing content (102) on the information module (116) as network-based resource.

Figure 2A:
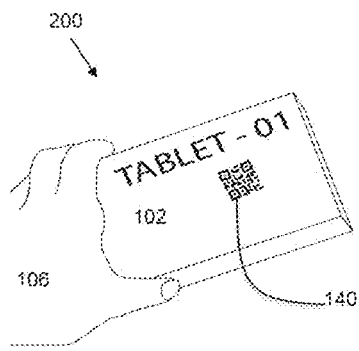
FIGS. 2A & 2B illustrates an exemplary implementation of the system of the FIG. 1, in accordance with an exemplary embodiment of the present invention.
Figure 2B:
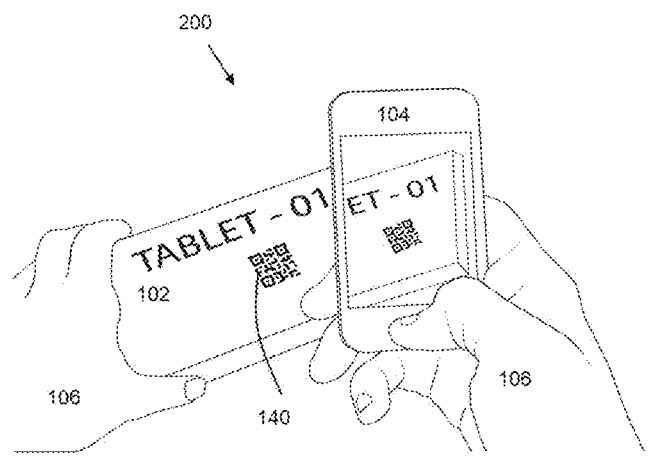

The FIGS. 2A & 2B illustrate an exemplary implementation (200) of the system (100) of the FIG. 1, in accordance with an exemplary embodiment of the present invention. As shown in FIG. 2A, one of the plurality of first users (106) is holding a product (102) having a product recognition code (140) printed on the product package. Preferably, the one of the plurality of first users (106) is a consumer or patient. Further, the consumer product manufacturer/lifescience company/pharmaceutical company/pharmacy retail made available their product (102) in the pharmacy or retail stores along with product recognition code (140), generated for this particular product (102) through product registry module (134) and configured & linked with on-demand product detailing content (120) created through authoring module (112) and stored in information module (116). Also furthered configured with communication user interfaces (122).

In FIG. 2B, the one of the plurality of first users (106) is using its one of the plurality of first computing devices (104) to scan the product recognition code (140) printed on the product (102) package. The product recognition code (140) may be pasted or printed on pill or tablet container or in associated materials. The product recognition code (140) enables the one of the plurality of first users (106) to reach the product recognition module (114) through the communication network (118) on their browser or custom client application. The product recognition module (114) redirect the one of the plurality of first users (106) to get connected with the information module (116) and the information module (116) delivers relevant on-demand product detailing content (120), in multiple languages, along with the plurality of communication user interfaces (122).

The one of the plurality of first users (106) can make instant video/audio call, by using the plurality of communication user interfaces (122), with patient support team/Pharmacist/HCPs and discuss their queries/concerns regarding the product (102) instantly. Further, the one of the plurality of first users (106) can interact with BOT or BOT Avatar, by using the plurality of communication user interfaces (122), through text chat or audio conversation regarding the product (102).

Figure 3A:
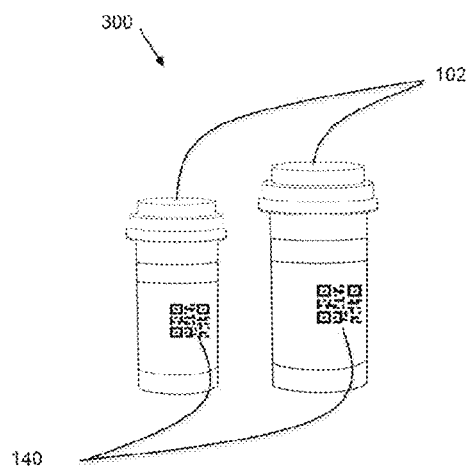
FIGS. 3A & 3B illustrates an exemplary implementation of the system of the FIG. 1, in accordance with another exemplary embodiment of the present invention.
Figure 3B:
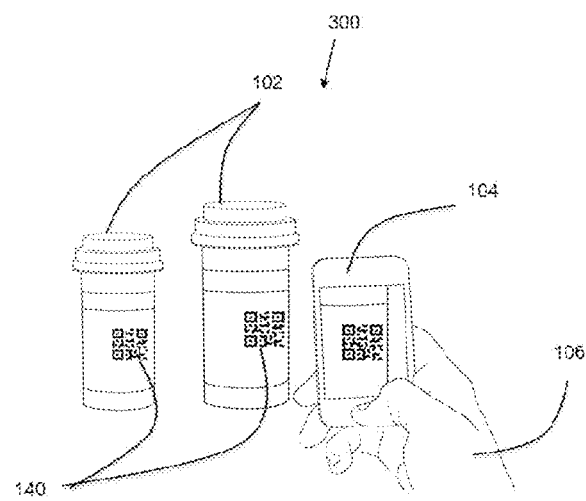

The FIGS. 3A & 3B illustrate an exemplary implementation (300) of the system (100) of the FIG. 1, in accordance with another exemplary embodiment of the present invention. As shown in FIG. 3A, the one of the plurality of second set of users (110) register a product (102) in the product registry module (134) and receive the corresponding product recognition code (138) from the product recognition module (114). Preferably, the product (102) is an over-the-counter product or a prescription medicine. The one of the plurality of second set of users (110) print and place the product recognition code (140) near the respective product (102) or paste it over the product package or PILL container itself. Further, the other plurality of second set of users (110) create the product/service detailing of the product (102) for the plurality of first set of users (106) using the authoring module (112). Preferably, the one of the plurality of second set of users (110) is manufacturer of the product (102) and the other plurality of second set of users (110) is healthcare professional or pharmacist of a pharmacy retail or online pharmacy.

Further, the other plurality of second set of users (110) stores the product or service detailing content as on-demand product or service detailing content (120) in the information module (116) and map or link on-demand detailing content (120) with respective product or service recognition code (138) in the information module (116). Also, the information module (116) configure the plurality of communication user interfaces (122) for instant video call assistance by the plurality of third set of users (132) or live interaction with AI BOT using the communication network (118). Preferably, the plurality of third set of users (132) are qualified healthcare assistance team/Pharmacist/HCPs/patient support team.

As shown in FIG. 3B, the one of the first set of users (106) i.e. consumer or patient is allowed to use their one of the plurality of first computing devices (104) i.e. personal hand-held devices to scan the product recognition code (140) printed or pasted on the product (102). The product recognition code (140) will allow the consumer/patient to reach the product recognition module (114) through the communication network (118) on their browser or custom client application. The product recognition module (114) redirect the consumer/patient to get connected with the information module (116) and the information module (116) delivers relevant on-demand product detailing content (120), in multiple languages, along with the plurality of communication user interfaces (122).

Figure 4A:
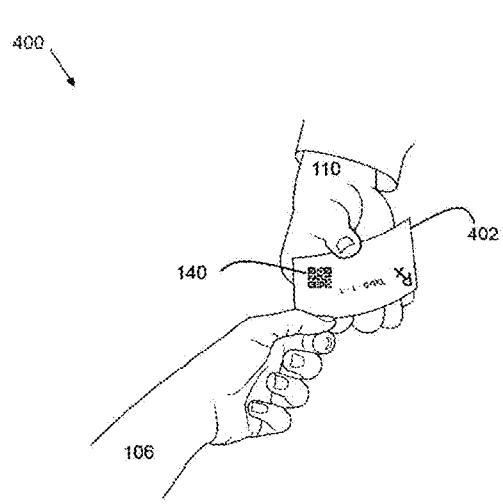
FIGS. 4A & 4B illustrates an exemplary implementation of the system of the FIG. 1, in accordance with yet another exemplary embodiment of the present invention.
Figure 4B:
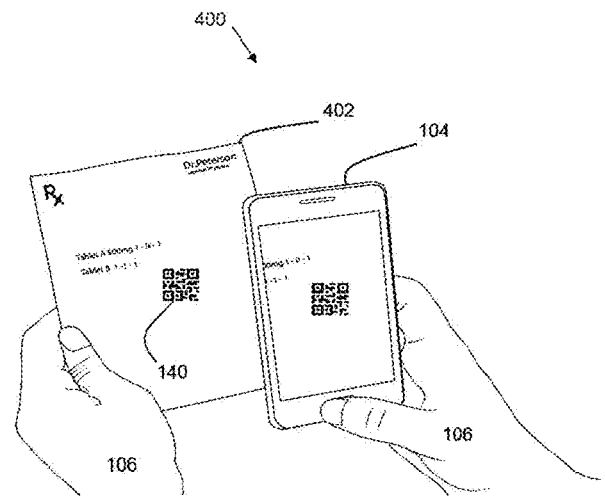

The FIGS. 4A & 4B illustrates an exemplary implementation (400) of the system (100) of the FIG. 1, in accordance with yet another exemplary embodiment of the present invention. As shown in FIG. 4A, the one of the plurality of second set of users (110) provided a prescription (402) to one of the first set of users (106). The one of the plurality of second set of users (110) records the on-demand service detailing content using authoring module and link it with the service recognition code (140). A product or service recognition code (140) is printed on the prescription (402). As shown in FIG. 4B, the one of the first set of users (106) scan the product or service recognition code (140) by its one of the plurality of first computing devices (104). The product recognition code (140) will allow the one of the first set of users (106) to reach the product recognition module (114) through the communication network (118) on their browser or custom client application. The product recognition module (114) redirect the one of the first set of users (106) to get connected with the information module (116) and the information module (116) delivers relevant on-demand product detailing content (120), in multiple languages, along with the plurality of communication user interfaces (122).

Figure 5A:
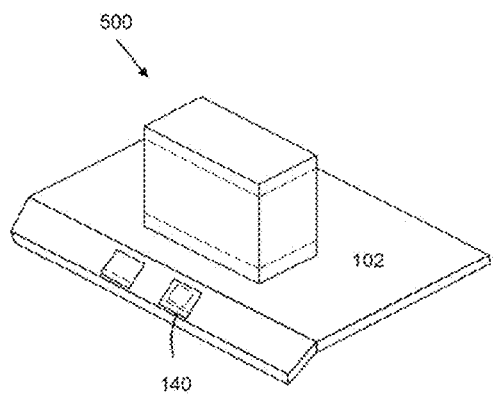
FIGS. 5A & 5B illustrates an exemplary implementation of the system of the FIG. 1, in accordance with an exemplary embodiment of the present invention.
Figure 5B:
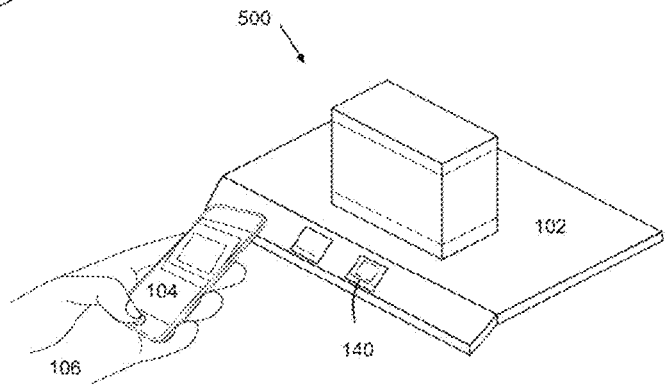

The FIGS. 5A & 5B illustrate an exemplary implementation (500) of the system (100) of the FIG. 1, in accordance with an exemplary embodiment of the present invention. As shown in FIG. 5A, a product (102) is put on display at one of a retail store. Further, a product recognition code (140) is pasted on the product (102) body.

As shown in FIG. 5B, the one of the first set of users (106) is scanning the product or service recognition code (140). The product recognition code (140) will allow the one of the first set of users (106) to reach the product recognition module (114) through the communication network (118) on their browser or custom client application. The product recognition module (114) redirect the one of the first set of users (106) to get connected with the information module (116) and the information module (116) delivers relevant on-demand product detailing content (120), in multiple languages, along with the plurality of communication user interfaces (122).

Figure 6:
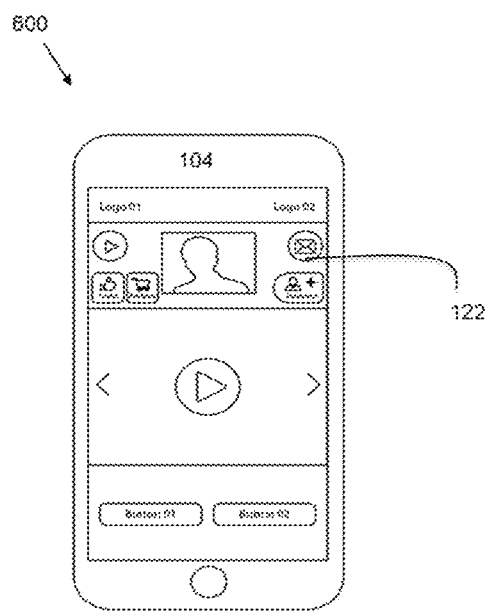
FIG. 6 illustrates an exemplary implementation of the system of the FIG. 1, in accordance with yet another exemplary embodiment of the present invention.

FIG. 6 illustrates an exemplary implementation (600) of the system (100) of the FIG. 1, in accordance with yet another exemplary embodiment of the present invention. As shown in FIG. 6, the information module (116) is activated on one of the plurality of first computing devices (104) of one of the plurality of first set of users (106). The on-demand product or service detailing content (120) being delivered from the information module (116), after scanning the product or service recognition code (140), to the plurality of first computing device (104) of the one of the plurality of first set of users (106) along with the relevant digital asset with the plurality of communication user interfaces (122) for video call, stock availability check, pre-booking options, etc. in a browser or custom client application on the plurality of first computing device (104) of the one of the plurality of first set of users (106).

Figure 7:
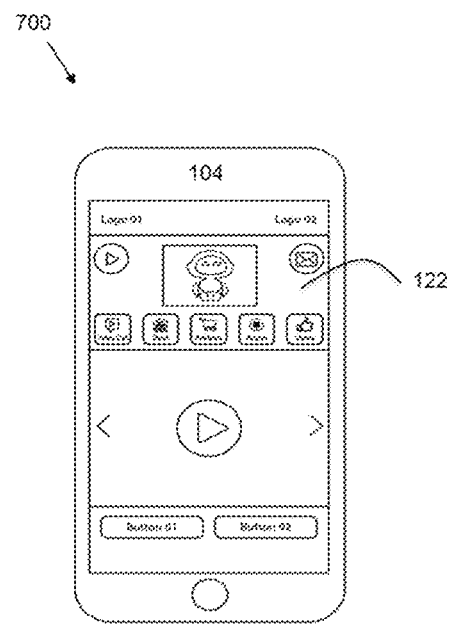
FIG. 7 illustrates an exemplary implementation of the system of the FIG. 1, in accordance with another exemplary embodiment of the present invention.

FIG. 7 illustrates an exemplary implementation (700) of the system (100) of the FIG. 1, in accordance with another exemplary embodiment of the present invention. As shown in FIG. 7, the information module (116) is activated on one of the plurality of first computing devices (104) of one of the plurality of first set of users (106). The on-demand product or service detailing content (120) being delivered from the information module (116) through the artificial intelligent based BOT avatar, after scanning the product or service recognition code (140), to the plurality of first computing device (104) of the one of the plurality of first set of users (106) along with the relevant digital asset with the plurality of communication user interfaces (122) for video call, stock availability check, pre-booking options, etc. using artificial intelligent based BOT avatar in a browser or custom client application on the plurality of first computing device (104) of the one of the plurality of first set of users (106).

Figure 8:
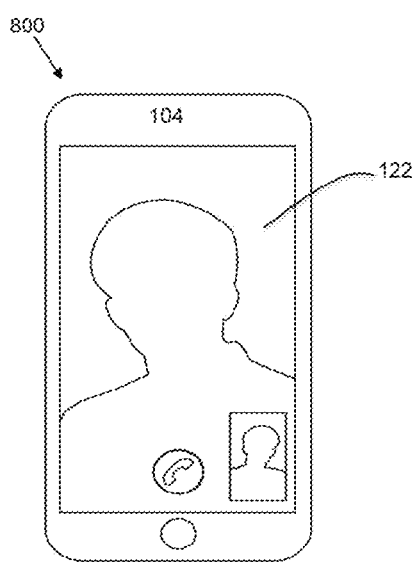
FIG. 8 illustrates an exemplary implementation of the system of the FIG. 1, in accordance with yet another exemplary embodiment of the present invention.

FIG. 8 illustrates an exemplary implementation (800) of the system (100) of the FIG. 1, in accordance with yet another exemplary embodiment of the present invention. As shown in FIG. 8, the one of the first set of users (106) is interacting with one of the third set of users (132) over instant live video/audio call or text by using one of the plurality of communication user interfaces (122) through the communication network (118) and enabling the one of the plurality of first set of users (106) to get the information about the product (102).

Figure 9:
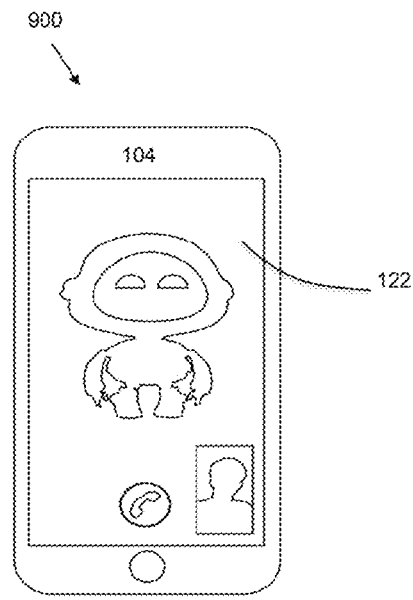
FIG. 9 illustrates an exemplary implementation of the system of the FIG. 1, in accordance with an exemplary embodiment of the present invention.

FIG. 9 illustrates an exemplary implementation (900) of the system (100) of the FIG. 1, in accordance with yet another exemplary embodiment of the present invention. As shown in FIG. 9, the one of the first set of users (106) is interacting with the artificial intelligence enabled host bot over instant live video/audio call or text by using one of the plurality of communication user interfaces (122) through the communication network (118) and enabling the one of the plurality of first set of users (106) to get the information about product.

Figure 10:
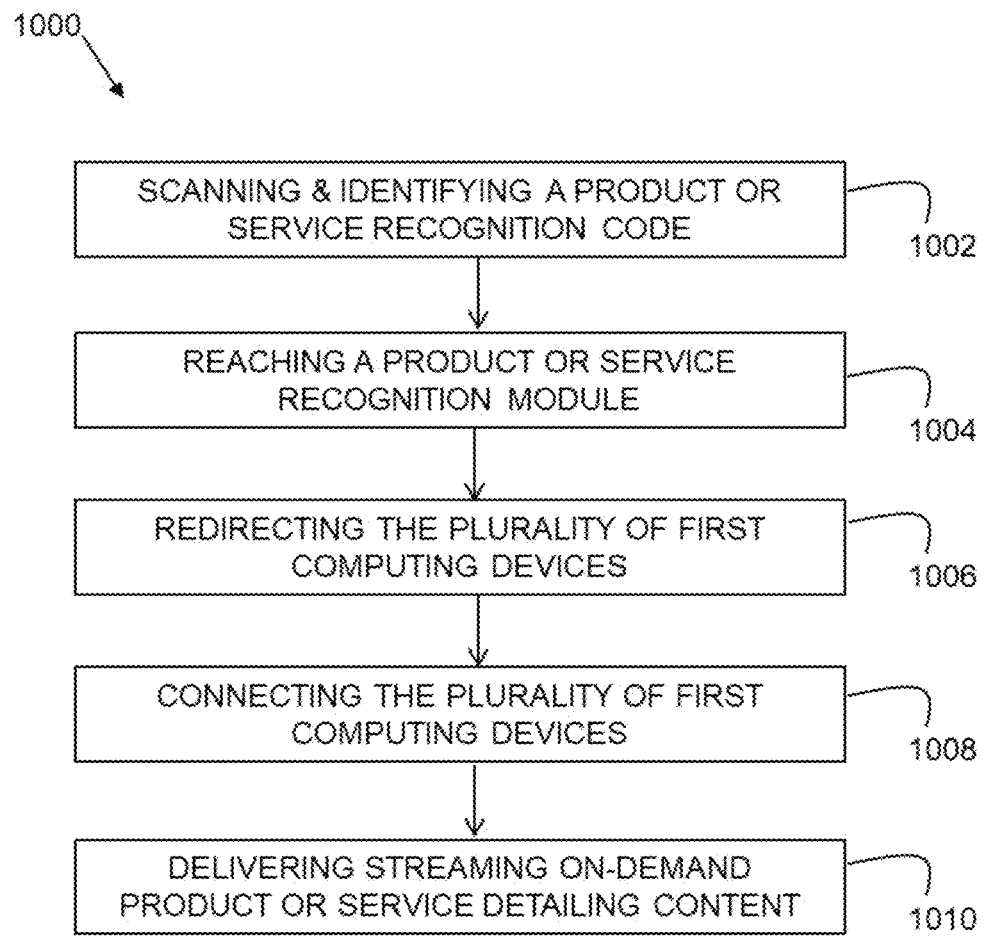
FIG. 10 is a flow chart illustrating a method for generating and presenting on-demand product or service detailing content with communication interface, in accordance with an embodiment of the present invention.

FIG. 10 is a flow chart illustrating the method (1000) for generating and presenting on-demand product or service detailing content (120) with communication interface (128), in accordance with an embodiment of the present invention.

It is pertinent to mention that the description of the components of the system (100) described above must be read as part and parcel of the description of the method (1000) and details of the each of the component of the system (100) bearing similar reference numerals have not been described hereinafter for sake of brevity.

The method (1000) starts at step 1002 when one of the first set of users (106) scan & identify the product or service recognition code (140) by using the plurality of first computing devices (104). Thereafter at step 1004, the plurality of first computing devices (104) reach the product or service recognition module (114) through the communication network (118).

At step 1006, the plurality of first computing devices (104) are redirected by the product or service recognition module (114) and at step 1008 the plurality of first computing devices (104) are connect with the information module (116) through the communication network (118).

Further, at step 1010 the information module (116) delivers the relevant streaming on-demand product or service detailing content (120), in multiple languages, to the plurality of first computing devices (104). The information module (116) is further configured to connect the plurality of first computing devices (104) to a plurality of communication user interfaces (122) to deliver on-demand real-time information about the product or service (102) in multiple languages.

In accordance with an embodiment of the present invention, the step of delivering (1010) further comprising a step of connecting the plurality of first computing devices (104) with the plurality of communication user interfaces (122) to deliver on-demand real-time information about the product or service (102). Further, the step of connecting comprising the step of providing on-demand real-time information about the product or service (102) to the plurality of first computing devices (104) via dynamic graphical user interface, stored network-based resources, remote text chat or voice & video call from the plurality of third computing devices (130) operated by the plurality of third set of users (132).

Figure 11:
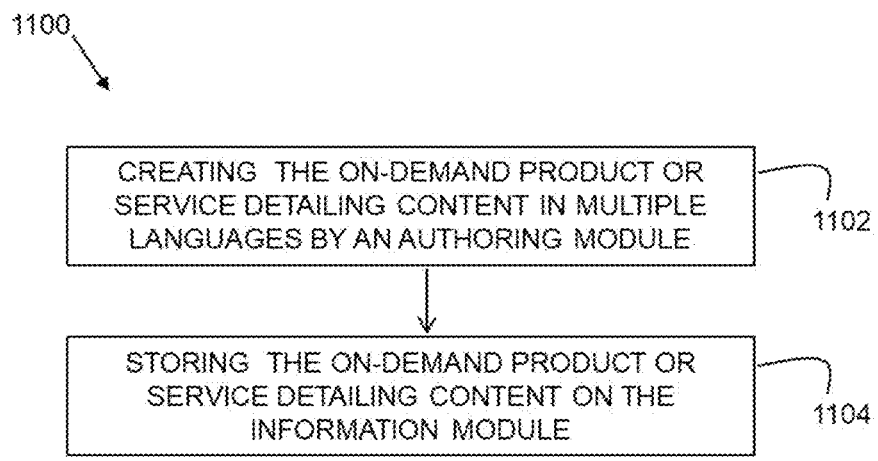
FIG. 11 illustrates one of the embodiments of the method disclosed in FIG. 10.

FIG. 11 illustrates one of the embodiments (1100) of the method (1000) disclosed in FIG. 10. As shown in FIG. 11, the method (1000) further comprising the steps of creating (1102) the on-demand product or service detailing content (120) in multiple languages by the authoring module (112) based on inputs received from the plurality of second set of users (110) using the plurality of second computing devices (108) through communication network (118) and storing (1104) the on-demand product or service detailing content (120) on the information module (116) as network-based resource.

In accordance with an embodiment of the present invention, the step of creating (1102) further comprising a step of authoring the on-demand product or service detailing content (120), in multiple languages, by using digital assets or live video along with audio recording or live audio recording, along with detailing multimedia presentation slide content being navigated or changes or marked or highlighted certain information in the slide as per video/audio narration or description being spoken and get synchronized.

Preferably, the digital assets is a group of existing video with audio, existing audio, presentation slide content, images, photos of product, photographs of pills or medicines, interactivity, polls, audio, graphics, video, animation, URLs, embedded media players to render media content and combination thereof.

In accordance with an embodiment of the present invention, the step of creating (1102) further comprising a step of authoring by using Artificial Intelligence based BOT, BOT Avatar, Machine voice and dynamic content curation from third party repository and create dynamic content automatically or semi-automatically along with detailing multimedia presentation slide content being navigated or changes or marked or highlighted certain information in the slide as per BOT avatar video/audio/machine voice narration or description and get synchronized In accordance with an embodiment of the present invention, the step of creating (1102) further comprising the steps of authoring, recording and synthesizing the on-demand product or service detailing content (120) in multiple languages.

Figure 12:
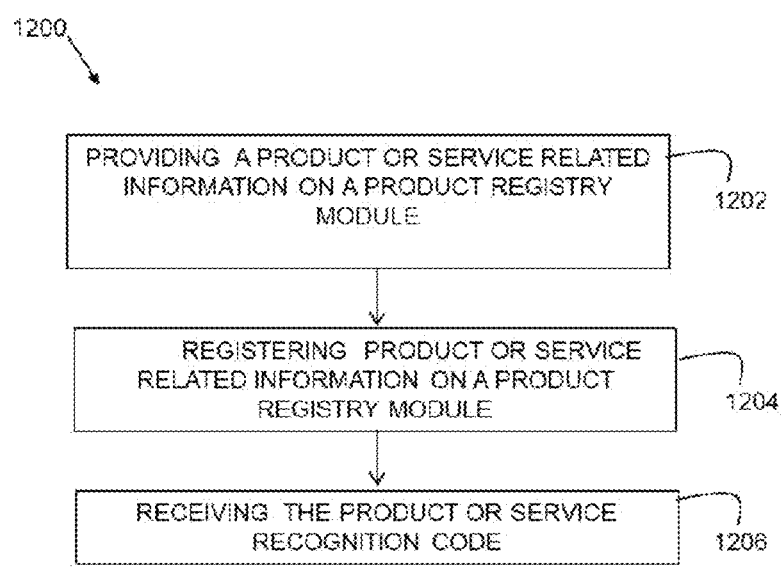
FIG. 12 illustrates another embodiment of the method disclosed in FIG. 10.

FIG. 12 illustrates another embodiment (1200) of the method (1000) disclosed in FIG. 10. As shown in FIG. 12, the method (1000) further comprising the steps of providing (1202) a product or service related information on the product registry module (134) by the plurality of second set of users (110) using the plurality of second computing devices (108) through the communication network (118), Further at step 1204 product or service related information is registered on the product registry module (134) and relevant on-demand product or service detailing content (120) along with the plurality of communication user interfaces (122) is mapped or linked with the product or service recognition code (138). At step 1206, receiving the product or service recognition code (138) is received for their respective product or service (102).

Figure 13:
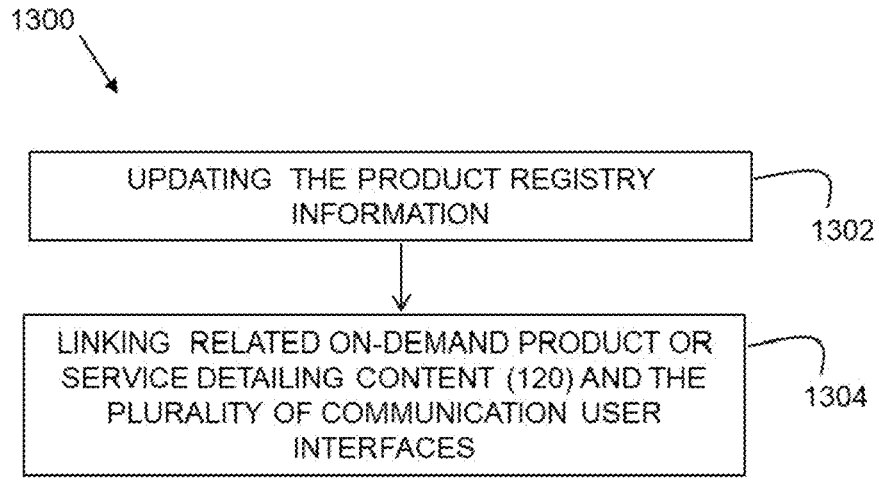
FIG. 13 illustrates yet another embodiment of the method disclosed in FIG. 10.

FIG. 13 illustrates yet another embodiment (1300) of the method (1000) disclosed in FIG. 10. As shown in FIG. 13, the method (1000) further comprising the steps of updating (1302) the product registry information about their respective product or service by the plurality of second set of users (110) by using the plurality of second computing devices (108) and linking (1304) related on-demand product or service detailing content (120) and the plurality of communication user interfaces (122) on the information module (116).

Figure 14:
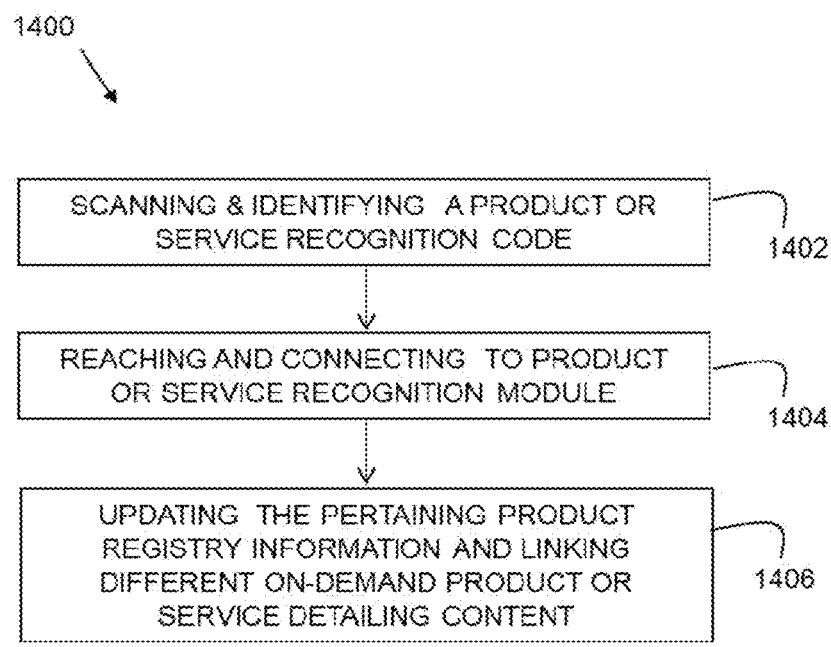
FIG. 14 illustrates one of the embodiments of the method disclosed in FIG. 10.

FIG. 14 illustrates one of the embodiments (1400) of the method (1000) disclosed in FIG. 10. As shown in FIG. 14, the method (1000) further comprising the steps of scanning & identifying (1402) a product or service recognition code (140) by the plurality of second computing devices (108) operated by the plurality of second set of users (110), reaching and connecting (1404) to product or service recognition module (114) through the communication network (118) and updating the pertaining product registry information and linking (1406) different on-demand product or service detailing content (120) from the information module (116).

Figure 15:
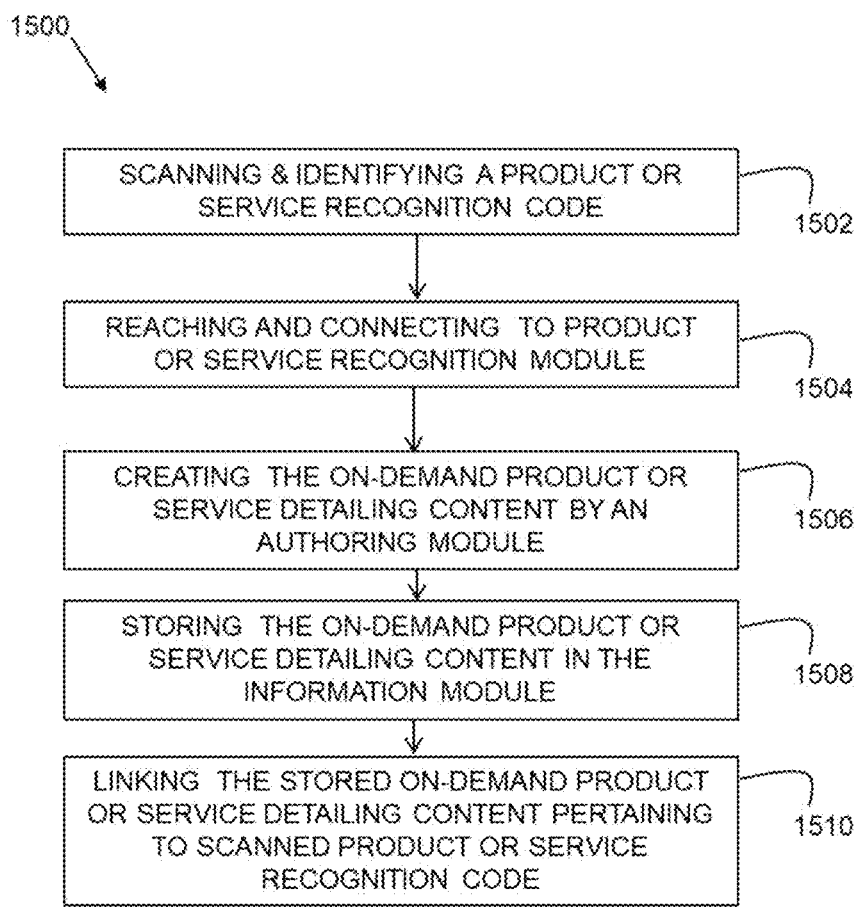
FIG. 15 illustrates another embodiment of the method disclosed in FIG. 10.

FIG. 15 illustrates another embodiment (1500) of the method (1000) disclosed in FIG. 10. As shown in FIG. 15, the method (1000) further comprising the steps of scanning & identifying (1502) a product or service recognition code (140) by the plurality of second computing devices (108) operated by the plurality of second set of users (110), reaching and connecting (1504) to product or service recognition module (114) through the communication network (118), creating (1506) the on-demand product or service detailing content (120) by the authoring module (112) based on inputs received from the plurality of second set of users (110) by using the plurality of second computing devices (108) through communication network (118), storing (1508) the on-demand product or service detailing content (120) in the information module (116) as network-based resource and linking (1510) the stored on-demand product or service detailing content (120) from the information module (116) with particular product registry information of scanned product or service recognition code (140).

In accordance with an embodiment of the present invention, the method (1000) further comprising the step of pre-booking particular product or service (102) to the plurality of first set of users (104). The step of pre-booking is carried out by a pre-booking module (124) provided in the information module (116).

In accordance with an embodiment of the present invention, the method (1000) further comprising the step of delivering information about stock availability of particular product or service to the plurality of first set of users (104). The step of delivering information is carried out by a stock availability module (126) provided in the information module (116).

The aforesaid method (1000) will now be elaborated by way of the following examples:

Example 1: This Example Illustrates Scenarios Pertaining to Retail and/or Commercial Showrooms Scenario 1—The plurality of second set of users such as store manager/sales personnel create & print the product or service recognition codes by using the method as per the various steps of the method described above:
1. Registering the products in product registry module.
2. Receiving the product recognition codes from product recognition module.
3. Print and place the product recognition codes near the respective products or paste it over the product package itself.
4. Later on-demand detailing content of the product can be created and linked.

Scenario 2—The plurality of second set of users such as store manager/sales personnel create, record & publish on-demand product or service detailing content by using the method as per the various steps of the method described above:
1. Register the products in product registry module.
2. Receive the Product recognition code from product recognition module.
3. Print and Place the product recognition codes near the respective products or paste it over the product package itself.
4. Allow sales personnel/product experts to video record the product/service detailing, in multiple languages, of a product using authoring module.
5. Store the detailing content as on-demand product or service detailing content in the information module.
6. Map or link on-demand detailing content with respective product or service recognition code in the information module.
7. Configure communication interfaces for instant video call assistance by customer engagement team or live interaction with AI BOT using communication network.
8. Configure stock availability module and pre-booking module as required to share real-time information on stock availability of a particular product and enable customers to register information for pre-booking a product/service.
9. Allow customers/consumer to use their personal hand-held devices to scan the product recognition code.
10. The recognition code will allow the customer to reach the product recognition module through communication network on their browser or custom client application.
11. The product recognition module redirects the customer to get connected with information module.
12. Information module delivers relevant linked on-demand product/service detailing content in multiple languages along with communication user interfaces.

Scenario 3—The plurality of second set of users such as store manager/sales personnel scan, edit & publish the product or service recognition codes by using the method as per the various steps of the method described above:
1. Scan the products using their smartphone or other computing devices to reach product registry module.
2. Edit or modify the registered information about the product.
3. Re-map or change the linked on-demand detailing content and other communication interfaces.
4. Save changes and publish instantly. By this, store managers/sales personnel can change and update the detailing content, communication user interfaces of product or service without the need to changing the product recognition code.

Scenario 4—The plurality of second set of users such as store manager/sales personnel scan, record & publish on-demand product or service detailing content by using the method as per the various steps of the method described above:
1. Scan the products recognition code using their smartphone or other computing devices to reach product registry module.
2. Record instant video detailing about the product/service using authoring module.
3. Store the detailing content as on-demand product or service detailing content in the information module.
4. Map or link on-demand detailing content with respective scanned product or service recognition code in the information module.
5. Save changes and publish instantly. By this, store managers/sales personnel can instantly create the detailing content and link with product/service recognition code without the need of changing the product recognition code.

Scenario 5—The plurality of first set of users such as customer or consumer scan & view on-demand product or service detailing content by using the method as per the various steps of the method described above:
1. Allow customers/consumer to use their personal hand-held devices to scan the product recognition code.
2. The recognition code will allow the customer to reach the product recognition module through communication network on their browser or custom client application.
3. The product recognition module redirects the customer to get connected with information module.
4. Information module delivers relevant linked on-demand product/service detailing content in multiple languages along with communication user interfaces to customers/consumers' personal hand-held devices.
5. Customers can make instant video/audio call with customer support team and discuss their queries regarding the product or service.
6. Customers can interact with BOT through text chat or audio conversation regarding the product or service.
7. Customers also have option to check for stock availability and make request for pre-booking the product or service.

Example 2: This Example Illustrates Scenarios Pertaining to Manufacturers of Consumer Products and Pharmaceuticals Scenario 1—The plurality of second set of users such as product experts/marketers create, record & publish on-demand product or service detailing content by using the method as per the various steps of the method described above:
1. Register the products in product registry module.
2. Receive the Product recognition code from product recognition module.
3. Print and Place the product recognition codes over the product package itself or inside the manual or other associated print materials.
4. Allow product experts to video record the product/service detailing of a product using authoring module.
5. Store the detailing content as on-demand product or service detailing content in the information module.
6. Map or link on-demand detailing content with respective product or service recognition code in the information module.
7. Configure communication interfaces for instant video call assistance by call center or customer engagement team or live interaction with AI BOT using communication network.

Scenario 2—The plurality of first set of users such as consumer or customer scan & view on-demand product or service detailing content by using the method as per the various steps of the method described above:
1. Allow customers/consumer to use their personal hand-held devices to scan the product recognition code pasted over the product package or in associated materials.

2. The product recognition code will allow the customer to reach the product recognition module through communication network on their browser or custom client application.
3. The product recognition module redirects the customer to get connected with information module.
4. Information module delivers relevant linked on-demand product/service detailing content in multiple languages along with communication user interfaces.
5. Customers can make instant video/audio call with call center or customer support team and discuss their queries regarding the product or service.
6. Customers can interact with BOT through text chat or audio conversation regarding the product or service.

Example 3: This Example Illustrates Scenarios Pertaining to Pharmacy Retails

Scenario 1—The plurality of second set of users such as pharmacy store manage create & print product or service recognition codes by using the method as per the various steps of the method described above:
 1. Register the place holder products/services in product registry module.
 2. Receive the Product recognition code from product recognition module.
 3. Print the product recognition codes in a sticker sheet.
 4. Provide these sheets to pharmacist to use.

Scenario 2—The plurality of second set of users such as pharmacist scan, record & publish on-demand product or service detailing content by using the method as per the various steps of the method described above:
 1. When patient approaches the pharmacist for medicine, Pharmacist will pack the medicines in the PILL container as per the patient's prescription and stick the product recognition code sticker over the medicine package or pill container.
 2. Pharmacist will scan the product recognition code using their smartphone or other computing devices to reach product registry module.
 3. Record instant video detailing about the product and their instructions to patients/consumer on how to take medicines along with photographs of medicine and other details using authoring module.
 4. Store the detailing content as on-demand product or service detailing content in the information module.
 5. Map or link on-demand detailing content with respective scanned product or service recognition code in the information module.
 6. Save changes and publish instantly. By this, Pharmacist can instantly create the detailing content for patients/consumers and link with product/service recognition code.

Scenario 3—The plurality of second set of users such as pharmacist scan, edit & publish on-demand product or service detailing content by using the method as per the various steps of the method described above:
 1. When patient approaches the pharmacist for medicine, Pharmacist will pack the medicines in the PILL container as per the patient's prescription and stick the product recognition code sticker over the medicine package or pill container.
 2. Pharmacist will scan the product recognition code using their smartphone or other computing devices to reach product registry module
 3. Pharmacist will edit or modify the registered information about the product or service.
 4. Map or link relevant pre-recorded on-demand detailing content for patients/consumers related to particular product/service and other communication interfaces.
 5. Save changes and publish instantly. By this Pharmacist can instantly map/link already created detailing content for patients/consumers with product/service recognition code.

Example 4: This Example Illustrates Scenarios Pertaining to Online-Pharmacy Retails Scenario 1—The plurality of second set of users such as online pharmacy store manager create & print product or service recognition codes by using the method as per the various steps of the method described above:
 1. Register the place holder products/services in product registry module
 2. Receive the Product recognition code from product recognition module
 3. Print the product recognition codes in a sticker sheet
 4. Provide these sheets to pharmacist to use Scenario 2—The plurality of first set of users such as patient is buying or refilling medicines by sending online request to the second set of users such as online pharmacy store manager by using the method as per the various steps of the method described above:
 1. Patient will upload and send the prescription to the online pharmacy to refill or buy medicines.
 2. Pharmacy will allow qualified pharmacist to pack the necessary medicines in a package or pill container as per the prescription.
 3. Pharmacist will stick a product/service recognition code over the package or pill container or associated materials.
 4. Scan the products recognition code using their smartphone or other computing devices to reach product registry module.
 5. Edit or modify the registered information about the product.
 6. Map or link relevant pre-recorded on-demand detailing content for patients/consumers related to particular product/service and other communication interfaces.
 7. Configure the communication interface to enable patients/consumers to have instant video/audio call with the particular pharmacist or patient support center.
 8. Save changes and publish instantly. By this, pharmacist can instantly map/link already created detailing content for patients/consumers with product/service recognition code.
 9. The medicine package reaches the patient through courier or e-commerce delivery team.
 10. Patient opens the package and scan the product recognition code pasted over the product package or pill container or in associated materials using their personal hand-held devices.
 11. The recognition code will allow the patient to reach the product recognition module through communication network on their browser or custom client application.
 12. The product recognition module redirects the consumer/patient to get connected with information module.
 13. Information module delivers relevant on-demand product/service detailing content in multiple languages along with communication user interfaces 14. Patients/Consumers can make instant video/audio call with patient support team/Pharmacist/HCPs and discuss their queries/concerns regarding the product or service.
15. Customers can interact with BOT through text chat or audio conversation regarding the product or service.

Scenario 3—The plurality of first set of users such as patient is buying or refilling medicines by sending online request to the plurality of second set of users such as online pharmacy store manager and the plurality of second set of users are providing updated on-demand product or service detailing content to the plurality of first set of users by using the method as per the various steps of the method described above:

1. Patient will upload and send the prescription to the online pharmacy to refill or buy medicines.
2. Pharmacy will allow qualified pharmacist to pack the necessary medicines in a package or pill container as per the prescription.
3. Pharmacist will stick a product/service recognition code over the package or pill container or associated materials.
4. Scan the products recognition code using their smartphone or other computing devices to reach product registry module.
5. Edit or modify the registered information about the product.
6. Record instant video detailing about the product and their instructions to patients/consumer on how to take medicines along with photographs of medicine and other details using authoring module.
7. Store the detailing content as on-demand product or service detailing content in the information module.
8. Map or link on-demand detailing content with respective scanned product or service recognition code in the information module.
9. The medicine package reaches the patient through courier or e-commerce delivery team.
10. Patient opens the package and scan the product recognition code pasted over the product package or in associated materials using their personal hand-held devices.
11. The recognition code will allow the patient to reach the product recognition module through communication network on their browser or custom client app.
12. The product recognition module redirects the customer to get connected with information module.
13. Information module delivers relevant linked on-demand product/service detailing content in multiple languages along with communication user interfaces.
14. Patients/Consumers can make instant video/audio call with patient support team/Pharmacist/HCPs and discuss their queries/concerns regarding the product or service.
15. Customers can interact with BOT through text chat or audio conversation regarding the product or service.

Example 5: This Example Illustrates Scenarios Pertaining Hospitals

Scenario 1—The plurality of second set of users such as hospital administrator/manager create & print product or service recognition codes by using the method as per the various steps of the method described above:

1. Register the place holder products/services in product registry module.
2. Receive the Product recognition code from product recognition module.
3. Print the product recognition codes in a sticker sheet.
4. Provide these sheets to healthcare professionals to use.

Scenario 2—The plurality of second set of users such as healthcare professionals recoding new advice for the plurality of first set of users by using the method as per the various steps of the method described above:

1. Patient would have undergone some surgery or treatment in a hospital.
2. Healthcare professional will provide prescription, discharge summary, medication pills as required during patient discharge.
3. Healthcare professional will stick a product/service recognition code over the pill container or discharge summary or prescription.
4. Scan the products recognition code using their smartphone or other computing devices to reach product registry module.
5. Edit or modify the registered information about the product/service.
6. Record instant video detailing about the instructions for patients/consumer on how to take medicines along with photographs of medicine, lifestyle modifications, Dos and Don'ts and other details using authoring module.
7. Store the detailing content as on-demand product or service detailing content in the information module.
8. Map or link on-demand detailing content with respective scanned product or service recognition code in the information module.
9. Handover the discharge summary, medicines and prescription to patients.
10. Patient can access and scan the product recognition code pasted over the discharge summary or medication pill container or prescription or in associated materials using their personal hand-held devices.
11. The recognition code will allow the patient to reach the product recognition module through communication network on their browser or custom client application.
12. The product recognition module redirects the customer to get connected with information module.
13. Information module delivers relevant linked on-demand detailing the instructions for patients/consumer on how to take medicines, lifestyle modifications, Dos and Don'ts and other details in multiple languages along with communication user interfaces.
14. Patients can make instant video/audio call with patient support team/Pharmacist/healthcare professionals and discuss their queries/concerns regarding the product or service
15. Patients can interact with BOT through text chat or audio conversation regarding the product or service.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

We claim:

1. A computer implemented method (1000) for generating and presenting on-demand product or service detailing content (120) with communication interface (128) comprising the steps of:
   providing (1202), by a plurality of second set of users (110) using a plurality of second computing devices (108), related information (136) of a product or service (102) of the plurality of second set of users (110) on a product registry module (134) through a communication network (118); registering (1204) product or service of the plurality of second set of users (110) on a product registry module (134);
   receiving (1206) a product or service recognition code (138) for respective product or service (102) of plurality of second set of users (110); creating (1102) the on-demand product or service detailing content (120) by an authoring module (112) based on inputs received from the plurality of second set of users (110) using plurality of second computing devices (108) through the communication network (118);
   storing (1104) the on-demand product or service detailing content (120) on an information module (116) as network-based resource;
   updating (1302) the product registry information about respective product or service of plurality of second set of users (110) by the plurality of second set of users (110) by using the plurality of second computing devices (108) and linking (1304) a related on-demand product or service detailing content (120);
   editing or modifying or updating (1306) the related on-demand product or service detailing content (120), by the plurality of second set of users (110), about the product or service (120) at least once without a need of changing product or service recognition code (138, 140) and mapping or linking the updated or modified or edited the related on-demand product or service detailing content (120) about the product or service;
   scanning & identifying (1002) the product or service recognition code (138) by a plurality of first computing devices (104) operated by a plurality of first set of users (106);
   reaching (1004) a product or service recognition module (114) through the communication network (118);
   redirecting (1006) the plurality of first computing devices (104) by the product or service recognition module (114);
   connecting (1008) the plurality of first computing devices (104) with the information module (116); and,
   delivering (1010) streaming on-demand product or service detailing content (120), along with a plurality of communication user interfaces (122) to the plurality of first computing devices (104) through the communication network (118).

2. The computer implemented method (1000) as claimed in claim 1, wherein the plurality of first computing devices (104) is personal portable handheld device of the plurality of first set of users (106) having a display, a graphical user interface and a product or service recognition code scanner.

3. The computer implemented method (1000) as claimed in claim 1, wherein the plurality of first set of users (106) is an individual, buyer or customer or visitor or guest or observer or consumer or patients or recipient or audience looking to buy a product or avail a service or learn about a product or artifacts or a subject.

4. The computer implemented method (1000) as claimed in claim 1, wherein the plurality of second computing devices (108) is portable handheld device or laptop or desktop or tablet.

5. The computer implemented method (1000) as claimed in claim 1, wherein the plurality of second set of users (110) is a sales representative or business owner or customer service personnel or retail managers or service provider or merchandiser or pharmacist or Healthcare professionals or trainer or educator or administrators of retails and showrooms or commercial establishment or Pharmacy or hospital or non-commercial establishment or institutional establishment or product manufacturer and marketers.

6. The computer implemented method (1000) as claimed in claim 1, wherein the step of creating (1102) further comprising a step of authoring the on-demand product or service detailing content (120) by using existing videos and/or audio, graphical animations along with multimedia slide content, with embedded media player to render a media content; marking/highlighting certain information in a slide as per video/audio description/narration; and, synthesizing and storing the on-demand product or service detailing content (120), in multiple languages, the on-demand product or service detailing content (120), in multiple languages, on the information module (116) as network-based resource.

7. The computer implemented method (1000) as claimed in claim 1, wherein the product or service recognition code (138) is a two-dimensional/three-dimensional barcode or multi-dimensional code or quick recognition code or typographical symbol or image in an electronic or physical form (140).

8. The computer implemented method (1000) as claimed in claim 1, wherein the product or service recognition code (138) comprising the product registry information about the product or service such as technical specification and instructions, Unique ID, and/or Unique network URL of product or service registry module.

9. The computer implemented method (1000) as claimed in claim 1, wherein the product or service recognition code (138) is provided physically near or attached to the product in a printed form (140).

10. The computer implemented method (1000) as claimed in claim 1, wherein the product or service recognition code (138) is provided in a RFID tag, NFC tag, and/or beacon attached to.

11. The computer implemented method (1000) as claimed in claim 1, further comprising the steps of:
    scanning & identifying (1402) a product or service recognition code (140) by the plurality of second computing devices (108) operated by a plurality of second set of users (110);
    reaching and connecting (1404) to product or service recognition module (114) through the communication network (118); and,
    linking different on-demand product or service detailing content (120) from the information module (116) at least once without a need of changing product or service recognition code (138, 140).

12. The computer implemented method (1000) as claimed in claim 1, further comprising the steps of:
    scanning & identifying (1502) a product or service recognition code (140) by the plurality of second computing devices (108) operated by a plurality of second set of users (110);
    reaching and connecting (1504) to product or service recognition module (114) through the communication network (118); and, linking (1510) the stored on-demand product or service detailing content (120) from the information module (116) pertaining to scanned product or service recognition code (140).

13. A non-transitory medium storing instructions that, when executed by one or more processors, cause the one or more processors to perform operations comprising the steps of:
- providing (1202), by a plurality of second set of users (110) using a plurality of second computing devices (108), related information (136) of a product or service (102) of the plurality of second set of users (110) on a product registry module (134) through a communication network (118);
- registering (1204) product or service of the plurality of second set of users (110) on a product registry module (134);
- receiving (1206) a product or service recognition code (138) for respective product or service (102) of plurality of second set of users (110);
- creating (1102) an on-demand product or service detailing content (120) by an authoring module (112) based on inputs received from the plurality of second set of users (110) using plurality of second computing devices (108) through the communication network (118);
- storing (1104) an on-demand product or service detailing content (120) on an information module (116) as network-based resource;
- updating (1302) the product registry information about respective product or service of plurality of second set of users (110) by the plurality of second set of users (110) by using the plurality of second computing devices (108) and linking (1304) related on-demand product or service detailing content (120);
- editing or modifying or updating (1306) the on-demand product or service detailing content (120), by the plurality of second set of users (110), about the product or service (120) at least once without a need of changing product or service recognition code (138, 140) and mapping or linking the updated or modified or edited on-demand detailing content (120) about the product or service;
- scanning & identifying (1002) the product or service recognition code (138) by a plurality of first computing devices (104) operated by a plurality of first set of users (106);
- reaching (1004) a product or service recognition module (114) through the communication network (118);
- redirecting (1006) the plurality of first computing devices (104) by the product or service recognition module (114);
- connecting (1008) the plurality of first computing devices (104) with the information module (116); and,
- delivering (1010) streaming on-demand product or service detailing content (120), along with a plurality of communication user interfaces (122) to the plurality of first computing devices (104) through the communication network (118).

* * * * *